Figure 1:
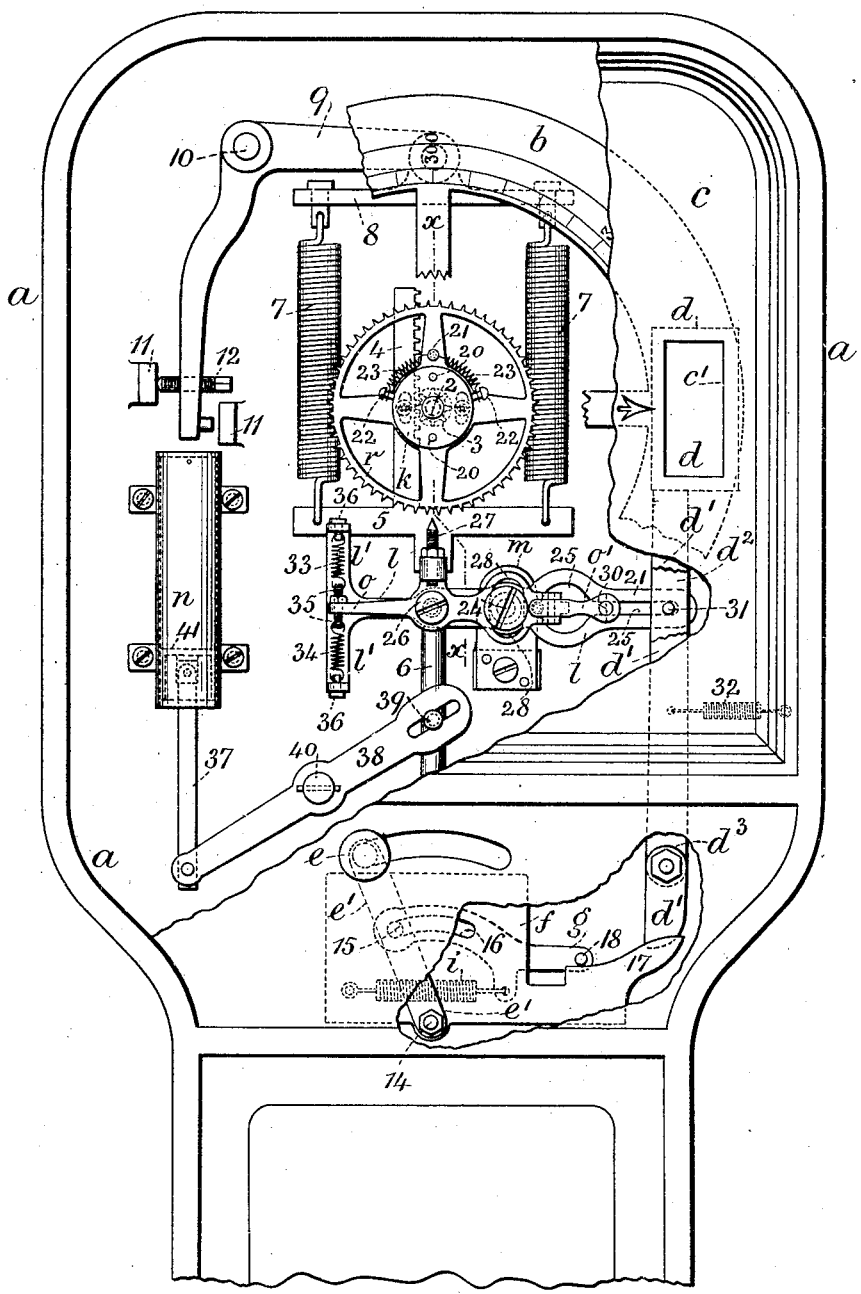

No. 700,620. Patented May 20, 1902.
E. H. COOK.
WEIGHING MACHINE.
(Application filed June 6, 1901.)

(No Model.) 2 Sheets—Sheet 1.

Witnesses:
J. Staib
Chas A Smith

Inventor:
Edgar H. Cook
per L. W. Sirrell & Son, attys

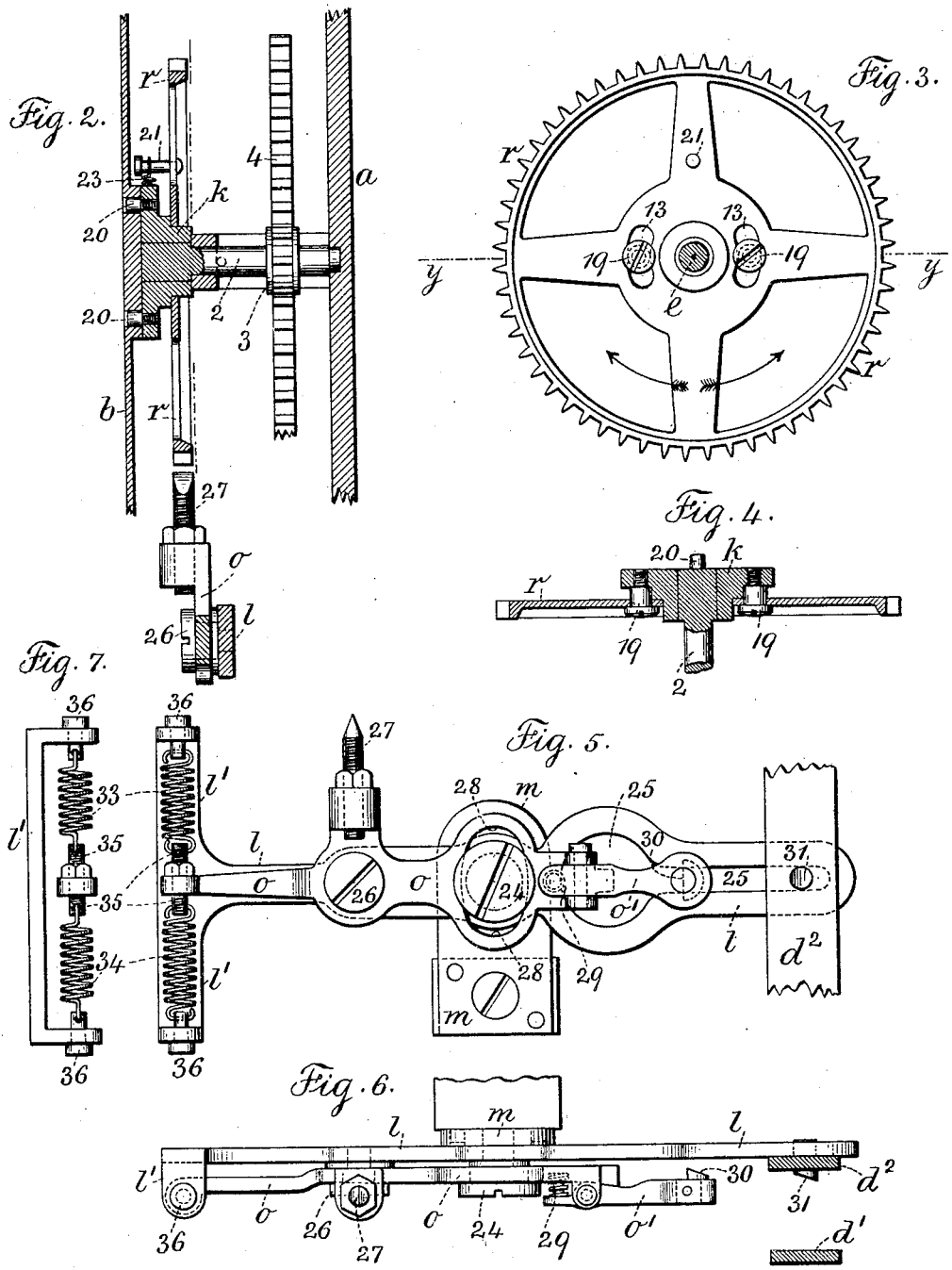

UNITED STATES PATENT OFFICE.

EDGAR H. COOK, OF BROOKLYN, NEW YORK.

WEIGHING-MACHINE.

SPECIFICATION forming part of Letters Patent No. 700,620, dated May 20, 1902.

Application filed June 6, 1901. Serial No. 63,368. (No model.)

*To all whom it may concern:*

Be it known that I, EDGAR H. COOK, a citizen of the United States, residing at the borough of Brooklyn, county of Kings, city and State of New York, have invented a new and useful Improvement in Weighing-Machines, of which the following is a specification.

My present invention relates to improvements upon the devices shown and described in my patent of December 18, 1900, No. 664,313, the object of the present invention being to in a measure simplify the construction to overcome certain objections and to make more positive the operation of the parts in the performance of their various functions.

Heretofore it has been common in weighing-machines to employ visible indicator-dials and index-fingers, which fingers were actuated by the weight of the person upon the platform, the mechanism being brought into action by the insertion of a coin in the machine. The device of my invention relates particularly to machines in which the indicator-dial is concealed beneath an ornamental face, there being an opening in the face and a shutter over the opening normally concealing the weight upon the dial behind the shutter, the said shutter being actuated by the person upon the platform of the machine after the insertion of a coin to discover the weight.

In my present invention the case, the platform, its lever, and the other parts of the weighing mechanism are shown of usual character, and the upper part of the case is provided with an ornamental face having an opening in one side thereof. The indicator-dial is concealed beneath the ornamental face, the opening coming at the weight indications, and a central pointer being provided to indicate the weight after the removal of the shutter. In this device I provide an operative mechanism, such operative mechanism being by preference a coin-actuated device, the means for actuating this mechanism being adapted to move an arm to which the said shutter is connected, so that after the person to be weighed steps upon the platform and operates the weighing mechanism the shutter is moved away from the opening in the ornamental face, so that the person upon the platform discovers the weight through the opening opposite the pointer.

My present invention relates particularly to devices for controlling the oscillatory movement of the weighing mechanism and dial to gradually bring the same to a state of rest, and in so doing to insure an accurate weight, and to devices engaging the shutter moved to discover the weight and between which parts there is a yielding movement, so that the functions of said parts are not disadvantageously affected by the action of either part.

In the drawings, Figure 1 is an elevation of the case, the weighing mechanism, and most of the operative parts, with the outer face broken away. Fig. 2 is a side elevation and partial section on the line $x$ $x$ of Fig. 1. Fig. 3 is a rear elevation of a toothed wheel. Fig. 4 is a horizontal section on the line $y$ $y$ of Fig. 3 of the said parts. Fig. 5 is an elevation, and Fig. 6 a plan, of the devices for locking and releasing the arm of the shutter; and Fig. 7 is an edge elevation of parts shown in Fig. 5. Figs. 2 to 7, inclusive, are upon the same scale and are of an exaggerated size in relation to the parts shown in Fig. 1 for clearness.

$a$ represents the case of the weighing-machine, which may be of any desired character or configuration. This case contains the indicator-dial $b$ upon an axis 2. The axis 2 carries a pinion 3, and a rack 4 engages the pinion 3, the lower end of the rack being connected to the cross-head 5. A rod 6 extends downward from the cross-head 5 to the lever of the weighing-platform, which latter parts are not shown. Between the cross-head 5 and the upper cross-head 8 there are helical springs 7, connected to said parts at their respective ends. The cross-head 8 is connected to a bell-crank-supporting lever 9, pivoted to a stud 10 upon the case, the free end of the bell-crank lever 9 being provided with an adjusting-screw 12, there being stops 11 upon opposite sides of the free end of the said lever, the screw 12 providing for the application of the proper tension to the springs. These parts just described are old in weighing-machines of this class, and I therefore do not claim the same.

The face $c$ of the weighing-machine occupies a position in front of the indicator-dial $b$, and said face may be ornamented and made attractive in any desired manner, the face being of such a character as to cause the indicator-dial behind the same to be invisible. At one side in the face $c$ I provide a rectangular opening $c'$, disposed vertically, and an adjacent pointer upon the face is centrally located with reference to the said opening, the said pointer being preferably on an imaginary horizontal line drawn through the axis of the weighing-machine. A shutter $d$ occupies a position behind the face $c$, normally covering the opening $c'$ therein. This shutter is larger than the said opening and is mounted upon an arm $d'$, connected to a hub $d^3$, and which hub preferably carries a second arm $d^2$. The arm $d'$ is between the face $c$ and the dial $b$ and the arm $d^2$ behind the dial $b$.

The hub $d^3$ is upon a stud projecting from the back of the case of the machine, and from the said hub extending downward there is an arm which is practically a continuation of the arm $d'$, and which arm carries the same letter of reference. A swinging movement is imparted to the arms $d'$ $d^2$ and the shutter $d$ upon the hub $d^3$ by a suitable operative mechanism. On the arm $d^2$ there is a latch-stud 31, and a spring 32 is connected at one end to the arm $d^2$ and at the other end to the case $a$ of the machine. I do not limit myself to the details of this operative mechanism; but for the purpose of an operative mechanism I have illustrated the following parts: A handle $e$, connected to a crank-arm $e'$, is in turn pivoted by a shaft 14 to a frame $f$, the said parts being within the case and the handle $e$ projecting through a curved mortise in the case. The crank-arm $e'$ carries a stud 15, passing through a curved slot 16 of the frame $f$, and the said stud on the other side of the frame is connected to a reciprocating plate $g$, moved back and forth by the handle $e$ and crank-arm $e'$ and the said stud, and to insure the return movement of these parts I provide a spring $i$, with one end fastened to the frame $f$ and the other end to a projection of the reciprocating plate $g$.

I provide a slideway 17, formed as a continuation of the frame $f$ and a pin or projection 18, connected to the reciprocating plate $g$, the pin or projection moving over the slideway and adapted to come against the lower end of the arm $d'$, which is adjacent thereto, so as to swing the arms $d'$ $d^2$ and move the shutter $d$. The movement of the handle device and this reciprocating plate $g$ thereby effects this swinging movement and removes or retracts the shutter $d$ from the opening $c'$ in the face $c$, so that the weight may be discovered upon the dial.

My present improvement relates particularly to the parts hereinafter described and which parts are adapted for controlling the oscillatory movement of the weighing mechanism and dial and gradually bringing the same to a state of rest to insure accurate weight and also to devices engaging the shutter moved to discover the weight, and between which parts there is a yielding movement, so that the function of each part is not disadvantageously affected by the action of the other part.

The axis 2, carrying the pinion 3, is provided with a hub $k$ of stepped form in cross-section and said hub is securely fastened to the said axis, and the dial $b$ is held or secured to the hub upon its face by screws or posts 20, which pass through the dial into the hub. I provide a toothed wheel $r$, loose upon the said hub $k$. This wheel is provided with mortises 13 at opposite sides of the axis, and it is connected to the hub by screws 19, passing through the mortises, so that while the toothed wheel is connected to the hub there is freedom of movement as between the respective parts to the extent of the length of the mortises.

The toothed wheel $r$ carries a pin 21, and the outer periphery of the hub $k$ is provided with pins 22 at opposite points, and springs 23 are connected at their respective ends to the pin 21 and to the pins 22 and occupy a curved position over the edge of the hub $k$. These pins 22 and the springs 23 maintain the toothed wheel $k$ in a predetermined relation to the hub $k$ and the axis 2, but the said toothed wheel $r$ may yield in either direction with reference to the hub to the extent of movement of the slots 13.

I provide an arm $l$ of peculiar form pivotally connected by a screw-stud 24 to an upright or post $m$ from the case of the machine. The right-hand end of the arm $l$ is made with a mortise 25, which has parallel sides at the end of the arm, but which is enlarged to a circular form adjacent to the stud 24. This arm $l$ at its other end is provided with auxiliary arms $l'$ in opposite directions, the ends of which are bent outward. A rocker-bar $o$ is pivotally connected to the arm $l$ by a screw-stud 26. This rocker-bar has a rising portion over the screw-stud 26, which carries an adjustable and removable tooth 27. The rocker-bar $o$ is provided with a mortise 28, extending around the screw-stud 24 for the purpose of continuing the said rocker-bar beyond the said screw-stud and providing for its movements in opposite directions. The right-hand end of the rocker-bar $o$ is provided with lugs to which the latch-bar $o'$ is pivotally connected, and a spring 29 is placed between the rocker-bar $o$ and the short end of the latch-bar $o'$, the free end of the latch-bar $o'$ being provided with a latch-stud 30, adapted to engage the latch-stud 31 on the shutter-arm $d^2$. The left-hand end of the rocker-bar $o$ is provided with a screw-stud 35, and springs 33 and 34 are connected at one end to opposite ends of this screw-stud and at their other ends to pins 36 in the respective ends of the auxiliary arms $l'$. Thus the rocker-bar $o$ and the arms $l$ $l'$ are normally held in a predetermined relation to one another, but are adapted to yield in either direction with reference to one another.

Upon the case $a$ of the weighing-machine I secure a plunger-case $n$, containing a piston 41, to which is pivotally connected the piston-rod 37. A pivot-post 40, projecting from the case $a$, carries a rocker-bar 38. One end of this rocker-bar is pivotally connected to the piston-rod 37 and the opposite end is provided with a mortise, and a pin 39 passes through the mortise into the vertical rod 6 of the weighing-machine, connecting this rod to this rocker-bar, so that in the operation of the weighing-machine as the rod 6 is pulled down by the weight of a person upon the platform the piston is forced into the case $n$, and when a person steps off the platform, the parts returning to their normal position, the piston is drawn down through the case. The movement of this piston either draws air into the case or expels the same, and this device assists in insuring the smooth even movement of the parts acting to control an oscillatory movement of the weighing mechanism and dial that would exist if the pneumatic plunger device were not present, as it is well known in these machines that the dial is liable to swing back and forth or, in other words, to oscillate very appreciably before finally coming to a state of rest to indicate the true weight of the person upon the platform, and while this pneumatic device may not entirely obviate this oscillating movement it not only lessens its extent but its duration, bringing the dial quickly to a state of rest, and so that too much movement may not be given to the shutter-controlling devices.

In the ordinary operation of the weighing mechanism after a person steps upon the platform the downward movement of the rod 6, the cross-head 5, and rack 4 rotates the pinion 3 and axis 2 and the indicator-dial $b$, and with the rotation of these parts the toothed wheel $r$ is also rotated and brought with said parts by the pneumatic device to a state of rest. The weight of the person is now of course concealed, and to discover the same it becomes necessary to remove the shutter $d$ from the opening $c'$ in the face. This is accomplished, as hereinbefore described, by the operation of the handle $e$. As the shutter $d$ with its arm $d^2$ are moved by the action of the operative mechanism the latch-stud 31, which extends rearward from the arm $d^2$ into the mortise 25, moves through the parallel-sided portion of said mortise swinging the arm $l$ upon its screw-stud 24 and with it the rocker-bar $o$, bringing the stud 27 into engagement with the teeth of the toothed wheel $r$. This action at once arrests the movement of the toothed wheel, and should the weighing mechanism not as yet have come to a state of rest the springs 23 between the pins 21 and 22 will yield to permit the axis 2, hub $k$, and dial $b$ to turn to the desired extent with the movement of the parts of the weighing mechanism, so that the true weight may be indicated. These several movements are effected so substantially simultaneously that this yielding function of the toothed wheel $r$ is very necessary, the present device overcoming in this way an inherent defect in the old mechanism.

The springs 33 and 34, as between the respective positions of the arm $l$ and the rocker-bar $o$, provide a yielding function, so that these parts may be accommodated according to the location of the tooth of the toothed wheel $r$, that may be engaged by the tooth 27 of the bar $o$. Otherwise were it not for this yielding function the toothed wheel $r$ might stop in such a position that the point of the tooth 27 would contact with the point of a tooth of the wheel $r$ instead of passing between two teeth. When the shutter $d$ is moved back to discover the weight and the arm $l$ and bar $o$ are moved, as hereinbefore described, the latch-stud 31 engages the latch-stud 30 and the respective parts are locked and held in position, and the shutter remains retracted from the opening in the case so long as the person being weighed remains on the platform. At once the person steps off the platform or the weight upon the platform is varied to an appreciable extent, which would be the case if one person stepped off and another tried to step on and obtain the weight of two persons with practically the one movement of the device, the toothed wheel $r$ is turned very appreciably, because of its size, by the movement of the parts of the weighing mechanism turning the axis 2. This movement swings the rocker-bar $o$ on its screw-stud 26 by the movement of the tooth 27 with reference to the toothed wheel $r$. In this movement the spring 34 is strained if the movement of the toothed wheel is in the one direction or the spring 33 is strained if the movement is in the opposite direction. However, with the movement in either direction the rocker-bar $o$ is so moved that the latch-stud 30 of the latch-bar $o'$ is elevated or depressed beyond its engagement with the latch-stud 31 of the shutter-arm, so that the shutter-arm is immediately released and the spring 32 returns the shutter to its normal position, covering the opening in the face and concealing the dial again. This return movement of the parts is substantially the same as that shown and described in my patent hereinbefore referred to except for the peculiar functions effected because of the structure of the parts.

I claim as my invention—

1. In a weighing-machine, the combination with the weighing mechanism and an indicator-dial, of a pneumatic retarding device connected to the case of the weighing-machine, and a rocking bar pivoted to the case connected at one end to the pneumatic device and at the other end to the vertical rod of the weighing-machine for controlling the oscillatory movement of the dial, substantially as set forth.

2. In a weighing-machine, the combination with the weighing mechanism, a face covering the indicator-dial thereof and having an opening therein and a shutter for normally covering the opening, of a pneumatic device for controlling the oscillatory movement of the weighing mechanism and indicator-dial, a hand-operated mechanism for effecting the movement of the shutter, and devices actuated by the movement of the shutter and acting in connection with the movement of the indicator-dial when the shutter is moved to discover the weight, substantially as and for the purposes set forth.

3. In a weighing-machine, the combination with the indicator-dial, the springs and other parts of the weighing mechanism and the vertical rod extending therefrom to the platform of the weighing-machine, of a plunger-case $n$ connected to the case of the weighing-machine and placed vertically therein, a pivot-post 40 also upon said case, a rocking bar 38 mounted upon said pivot-post and having a longitudinal mortise at one end, a pin 39 passing through the mortise of said bar into the vertical bar of the weighing-machine to connect the parts, a piston in the plunger-case, and a rod 37 connected thereto and pivotally connected to the rocking bar, substantially as and for the purposes set forth.

4. In a weighing-machine, the combination with the weighing mechanism, a face covering the indicator-dial thereof and having an opening therein, and a shutter for normally covering the opening, and a hand-operative mechanism for actuating the shutter, of a device for engaging the shutter and holding the same away from the opening in the face, and a yielding device connected to the axis of the indicator-dial and adapted to be engaged by the aforesaid shutter-holding means, substantially as set forth.

5. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a toothed wheel mounted upon the axis of the indicator-dial, means for limiting the movement of the same and for providing a yielding movement thereof in opposite directions with reference to said axis, and means substantially as described operated by the shutter-arm for simultaneously engaging the said toothed wheel and holding the shutter away from the opening in the face, substantially as set forth.

6. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a toothed wheel loosely mounted upon the axis of the indicator-dial, means for connecting said toothed wheel to said axis and for providing a limited movement of the toothed wheel in relation thereto, means for yieldingly connecting the said toothed wheel to the said axis and which means provides for the movement of the said toothed wheel in relation to the said axis in either direction a distance agreeing with the limiting movement of the aforesaid means, and means substantially as described operated by the shutter-arm for simultaneously engaging the said toothed wheel and holding the shutter away from the opening in the face, substantially as set forth.

7. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a hub of stepped form in cross-section secured to the axis of the indicator-dial, a toothed wheel loose upon the said stepped hub and having oppositely-placed mortises, and screws passing through the mortises into the said hub for securing the toothed wheel to the hub, and yet providing for a predetermined movement in opposite directions proportioned to the length of the said mortises, a pin upon the said toothed wheel, and pins at opposite points in the periphery of the said hub, and helical springs connected at one end to the pin of the toothed wheel and at their other ends to the pins of the said hub, whereby the toothed wheel is free to turn in either direction an extent equal to the length of the said mortises, putting one of the said springs under tension and by which the toothed wheel is returned to its normal position, the said springs acting together to maintain the toothed wheel in a predetermined relation to the said axis of the indicator-dial, and means substantially as described operated by the shutter-arm for simultaneously engaging the said toothed wheel and holding the shutter away from the opening in the face, substantially as set forth.

8. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a toothed wheel mounted upon the axis of the indicator-dial, means for limiting the movement of the same and for providing a yielding movement thereof in opposite directions with reference to said axis, a pivotal arm, a latch-stud on the arm of the shutter engaging a slot in said pivotal arm, a rocker-bar pivoted to the said arm, and means for maintaining the relation of the pivoted arm to the rocker-bar, a device connected to the rocker-bar adapted to engage the toothed wheel and a device forming a continuation of the rocker-bar and adapted to engage the latch-stud of the shutter-arm whereby the shutter-arm is held by the latch-bar and is released therefrom, substantially as set forth.

9. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a toothed wheel mounted upon the axis of the indicator-dial, means for limiting the movement of the same and for providing a yielding movement thereof in opposite directions with reference to said axis, a pivoted arm $l$ carried by an upright of the case and mortised at one end, a latch-stud connected to the shutter-arm and at one side of the said arm passing into the said mortise, a rocker-bar pivotally connected to the said arm, a tooth 27 carried by said rocker-bar and adapted to engage the teeth of the toothed wheel, a latch-bar pivoted to one end of the rocker-bar, and a spring for actuating the same, a latch-stud upon the free end of the latch-bar adapted to engage the latch-stud of the shutter-arm, and spring-acting devices connecting the pivoted arm and the rocker-bar and also the latch-bar in relation to one another, substantially as set forth.

10. In a weighing-machine, the combination with the weighing mechanism, a face covering the indicator-dial thereof and having an opening therein, a shutter for normally covering the opening, a pivotal shutter-arm for the shutter, and a hand-operative mechanism for swinging the shutter-arm and shutter, of a toothed wheel mounted upon the axis of the indicator-dial, means for limiting the movement of the same and for providing a yielding movement thereof in opposite directions with reference to said axis, an arm $l$ connected by a screw-stud pivotally to an upright $m$ of the case, said arm $l$ being provided at one end with a mortise 25 having a portion of circular form and a portion with parallel edges, a latch-stud 31 on the shutter-bar $d^2$ projecting from one side of said shutter-bar into said mortise, auxiliary arms $l'$ extending in opposite directions from the opposite end of the said arm $l$, a rocker-bar $o$ and a screw-stud 26 for pivotally connecting the same to the arm $l$, said bar $o$ having a mortised portion 28 encircling the screw-stud 24, and an adjustable removable tooth 27 connected to the rocker-bar $o$ above the screw-stud 26, a spring-actuated latch-bar $o'$ pivoted at one end of the rocker-bar $o$, a latch-stud 30 on the free end of said latch-bar adapted to engage the latch-stud 31 of the shutter-arm, a screw-stud 35 extending through the opposite end of the rocker-bar $o$, and springs 33, 34 connected at one end to the said screw-stud 35 and at the other ends to studs in prolongations of the auxiliary arms $l'$, substantially as and for the purposes set forth.

Signed by me this 31st day of May, 1901.

EDGAR H. COOK.

Witnesses:
GEO. T. PINCKNEY,
S. T. HAVILAND.